United States Patent [19]
Kim et al.

[11] Patent Number: 6,132,019
[45] Date of Patent: Oct. 17, 2000

[54] DOOR ASSEMBLY FOR A COMPUTER

[75] Inventors: Sung Kim, Palo Alto; Colin Alexander Davis, Sunnyvale; Ronald Jack Smith, Foster City; Steven G. Siefert, Belmont, all of Calif.

[73] Assignee: Silicon Graphics, Inc., Mountain View, Calif.

[21] Appl. No.: 09/372,660

[22] Filed: Aug. 11, 1999

[51] Int. Cl.[7] .................................................. A47B 97/00
[52] U.S. Cl. ................................ 312/223.2; 312/319.1; 312/322
[58] Field of Search ............................... 312/319.1, 312, 312/306, 223.2, 223.1, 139.2, 138.1, 319.2

[56] References Cited

U.S. PATENT DOCUMENTS

| | | | |
|---|---|---|---|
| 2,936,206 | 5/1960 | Wilmer et al. | 312/322 X |
| 3,851,939 | 12/1974 | Benasutti et al. | 312/139.2 X |
| 4,852,212 | 8/1989 | Amann | 312/322 X |
| 5,169,218 | 12/1992 | Chu | 312/306 X |
| 5,386,636 | 2/1995 | Asano | 312/319.2 |
| 5,924,780 | 7/1999 | Ammon et al. | 312/223.2 |
| 5,971,514 | 10/1999 | Hayakawa | 312/319.2 |

*Primary Examiner*—Peter R. Brown
*Assistant Examiner*—Michael J. Fisher
*Attorney, Agent, or Firm*—Wagner, Murabito & Hao LLP

[57] ABSTRACT

A door assembly that includes a door that is operable to alternatively expose and cover an opening in the bezel of a computer. The door assembly includes a carriage that slides up and down that pivotally couples to the door. Upon pressing against the lower portion of the door, the door pivots and the carriage and the door automatically slide down such that the door no longer covers the opening in the bezel. When an upward force is applied to the door, the door and the carriage move upward and into the closed position. As the door reaches the opening in the bezel, a spring forces the door against the bezel and into the closed position. The door is easily opened and closed and the door is out of the way when the door is in the open position.

16 Claims, 11 Drawing Sheets

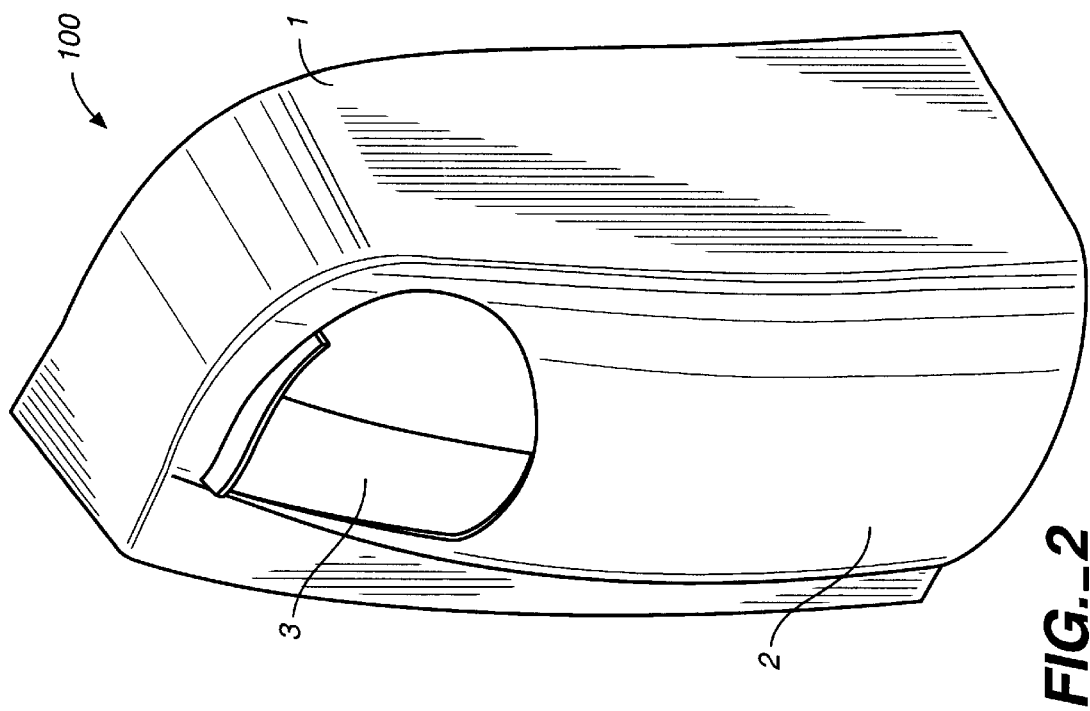
FIG._2
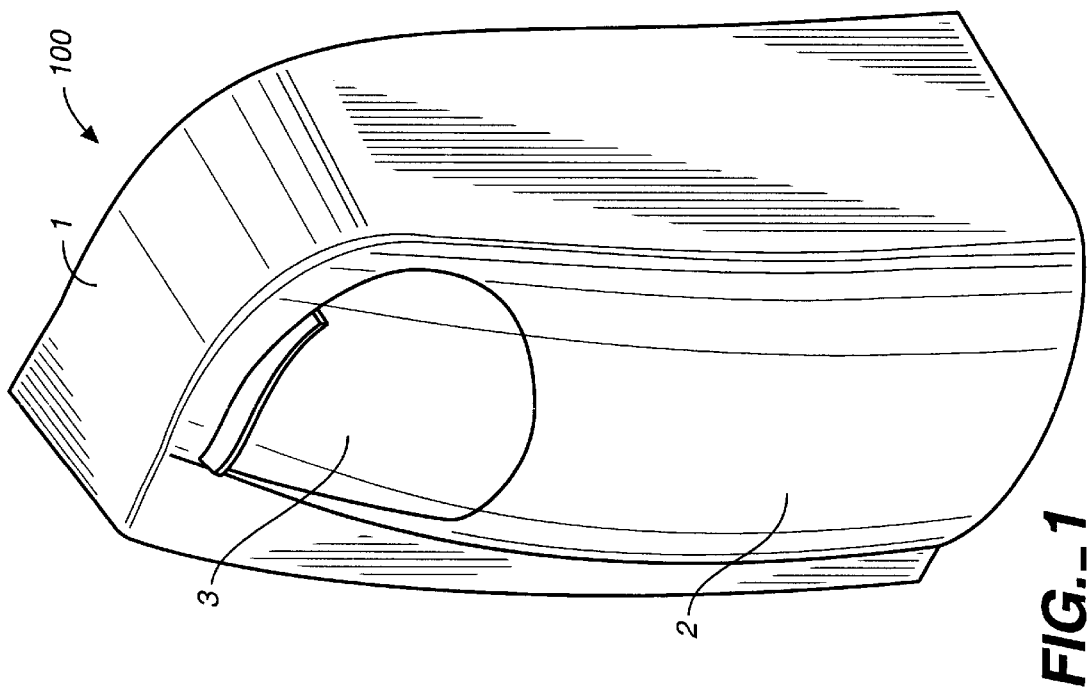
FIG._1

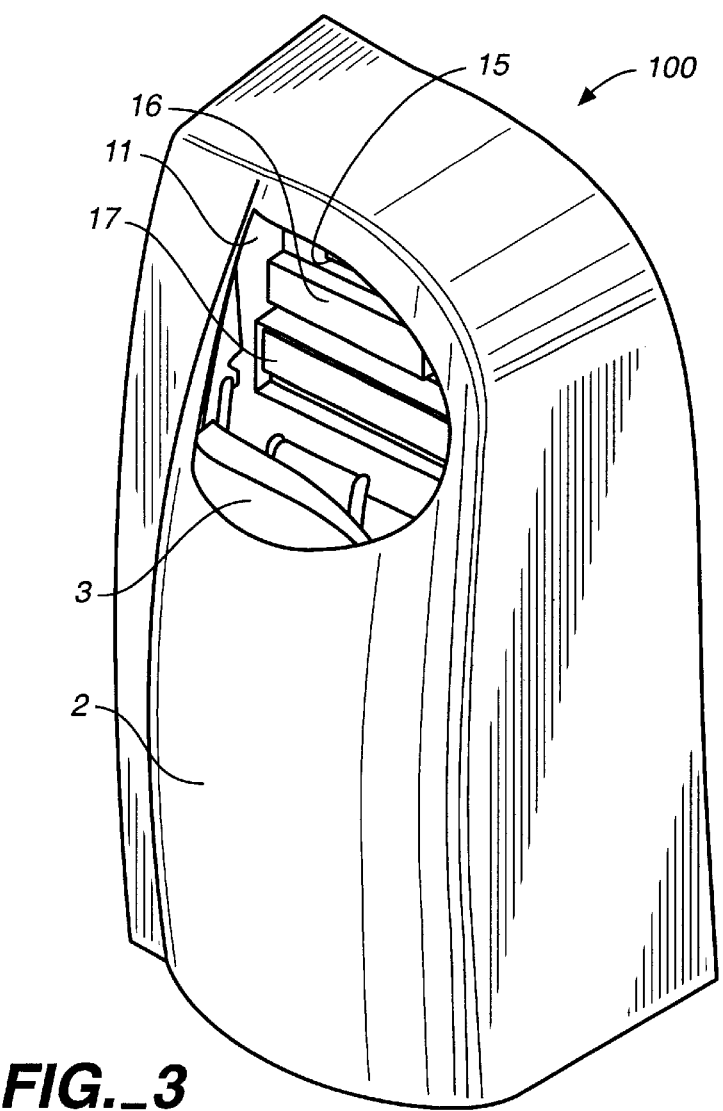
FIG._3
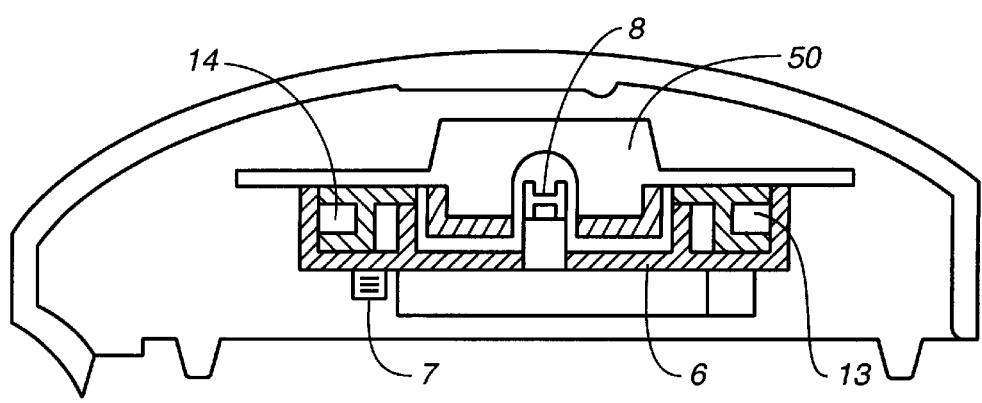
FIG._9

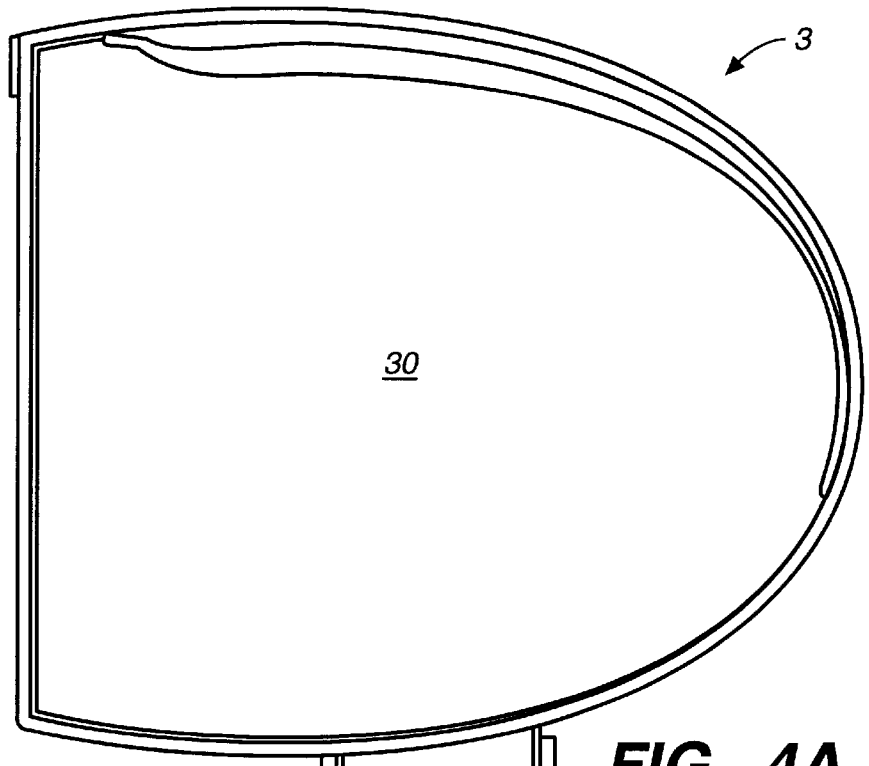
FIG._4A
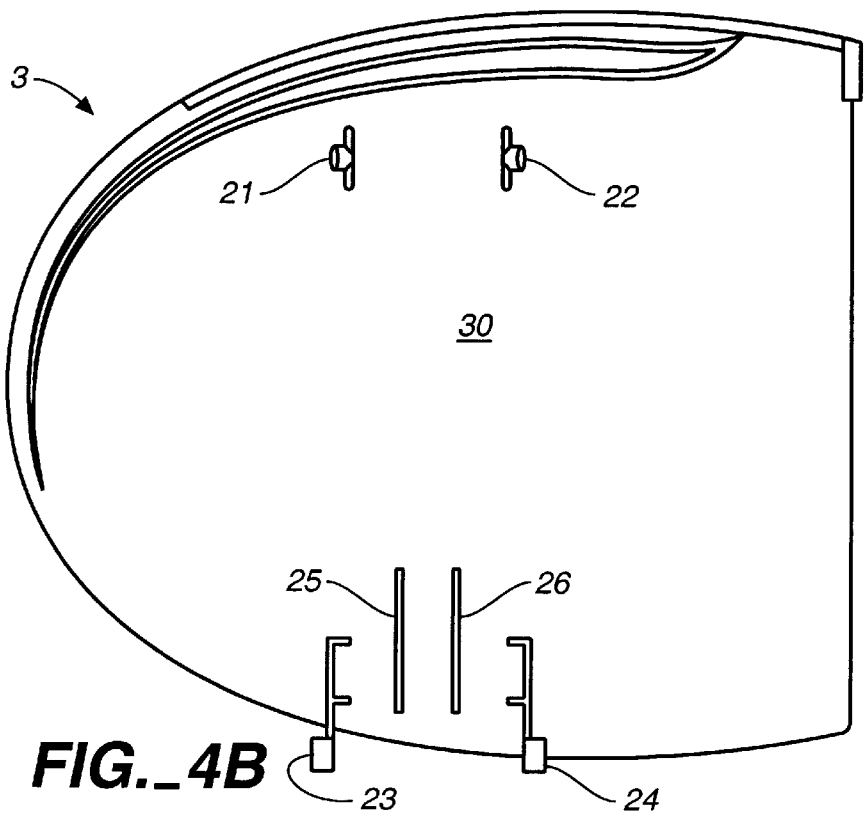
FIG._4B

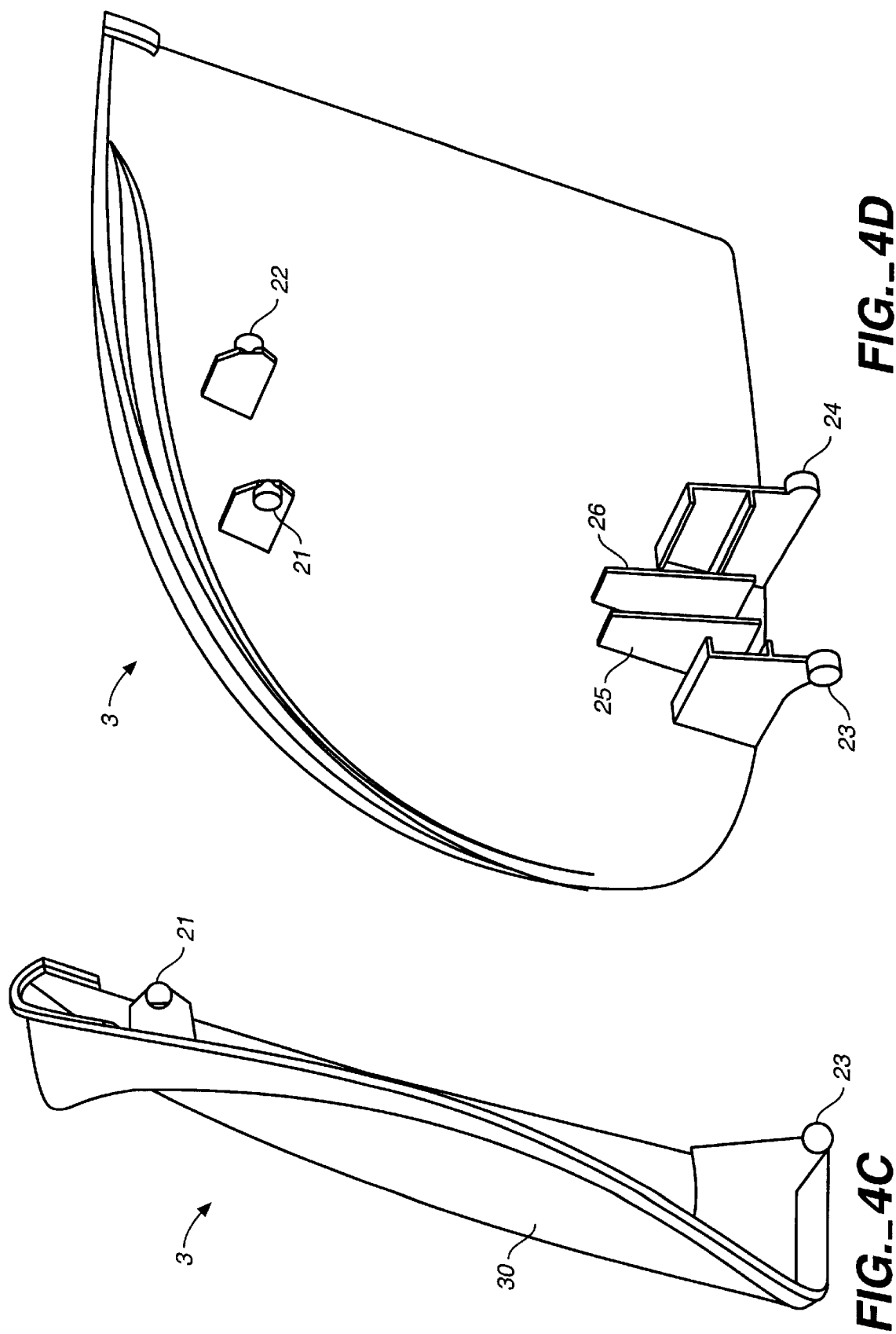

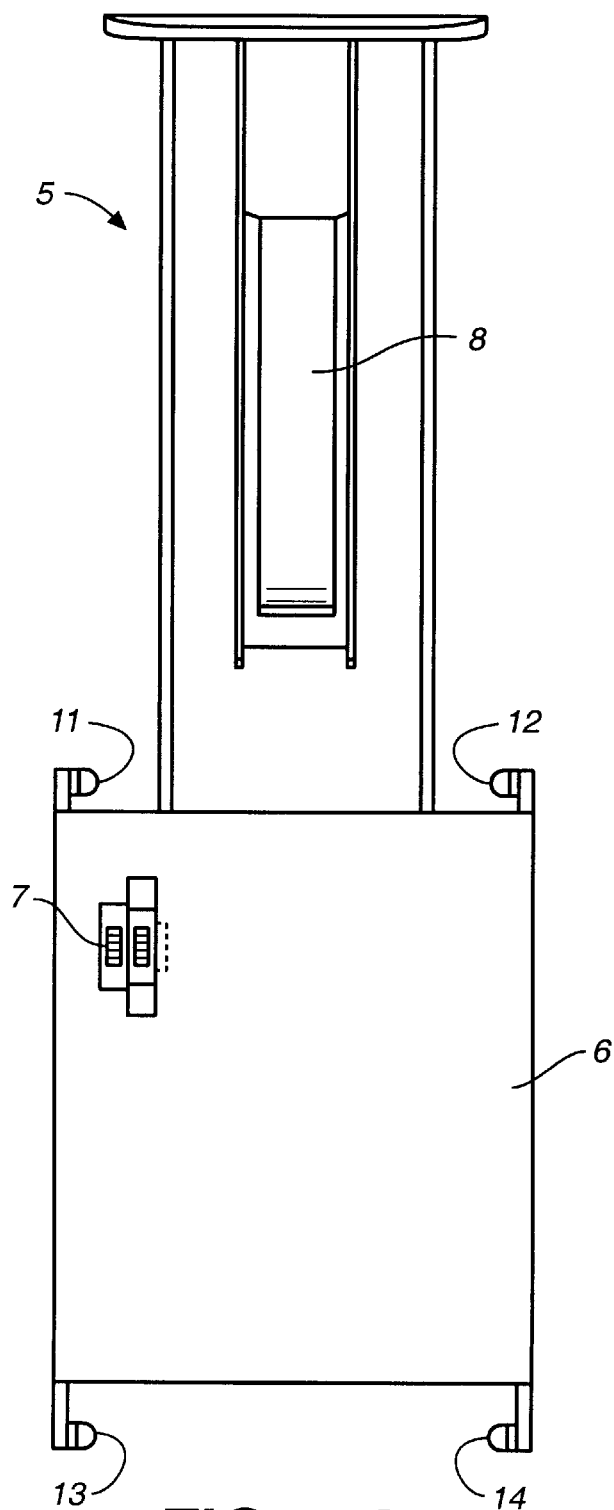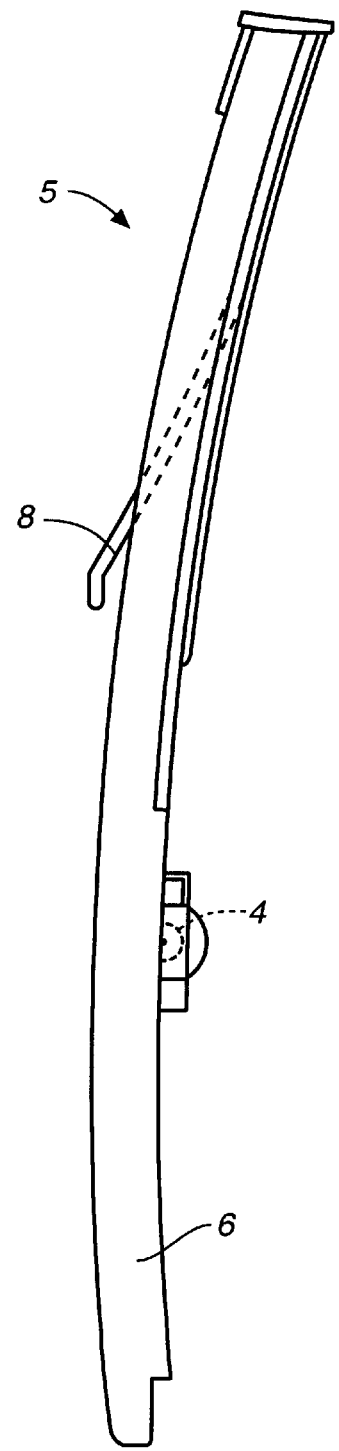
FIG._5A   FIG._5B

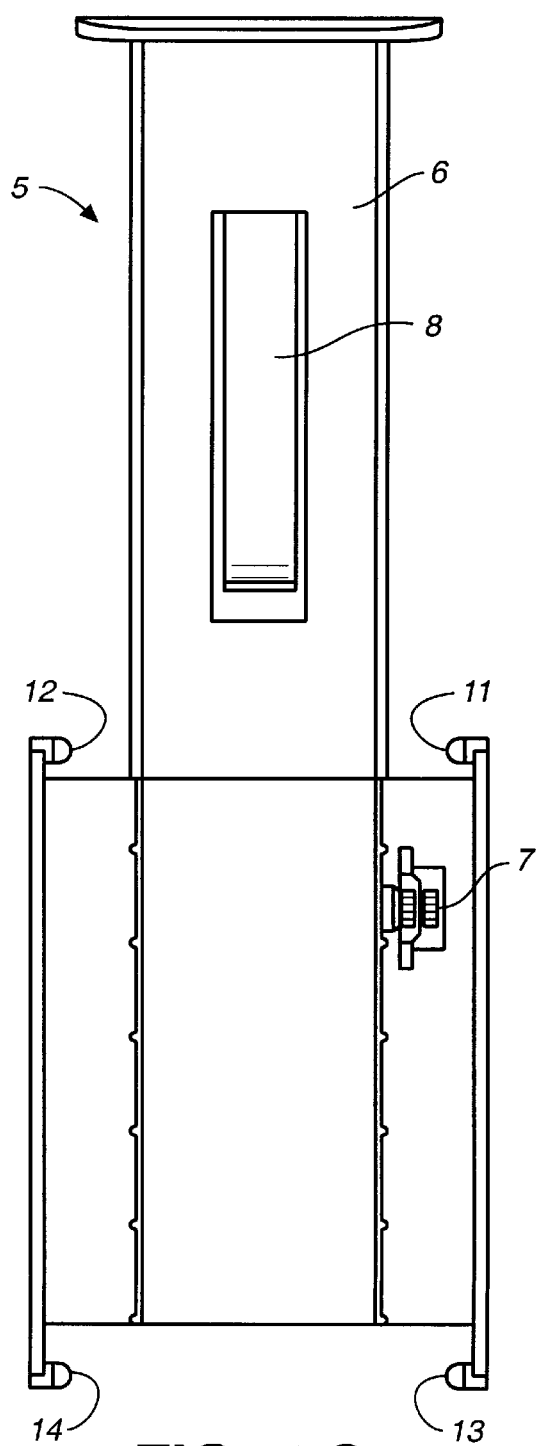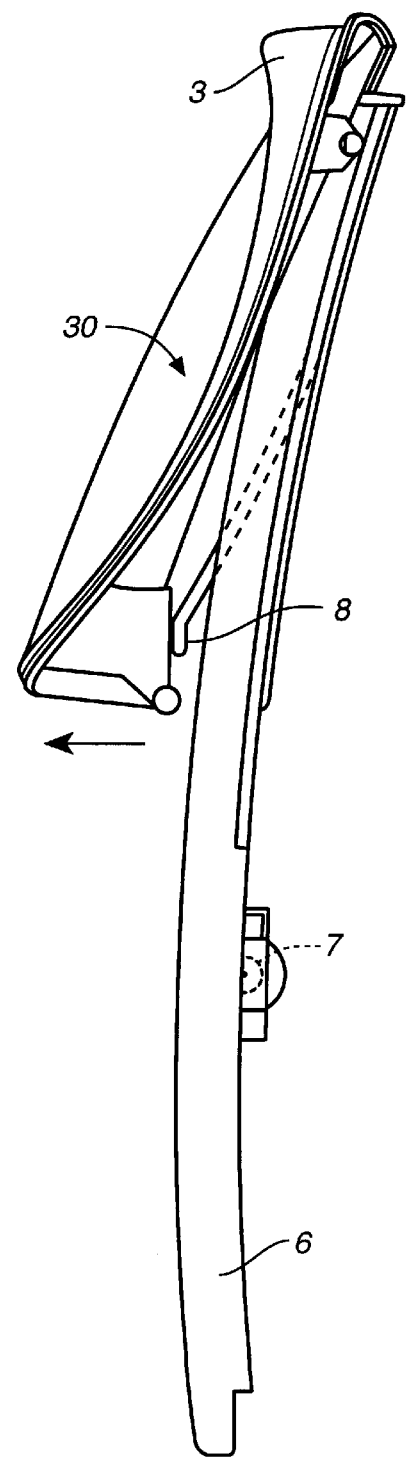
FIG._5C  FIG._6

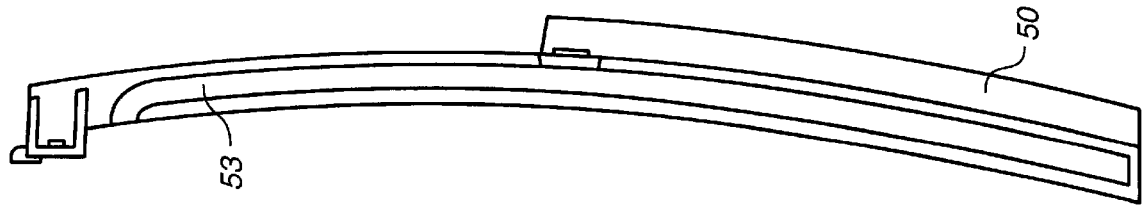
FIG._7C
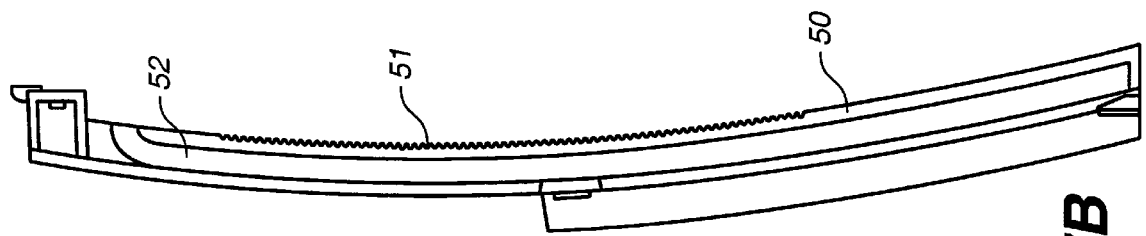
FIG._7B
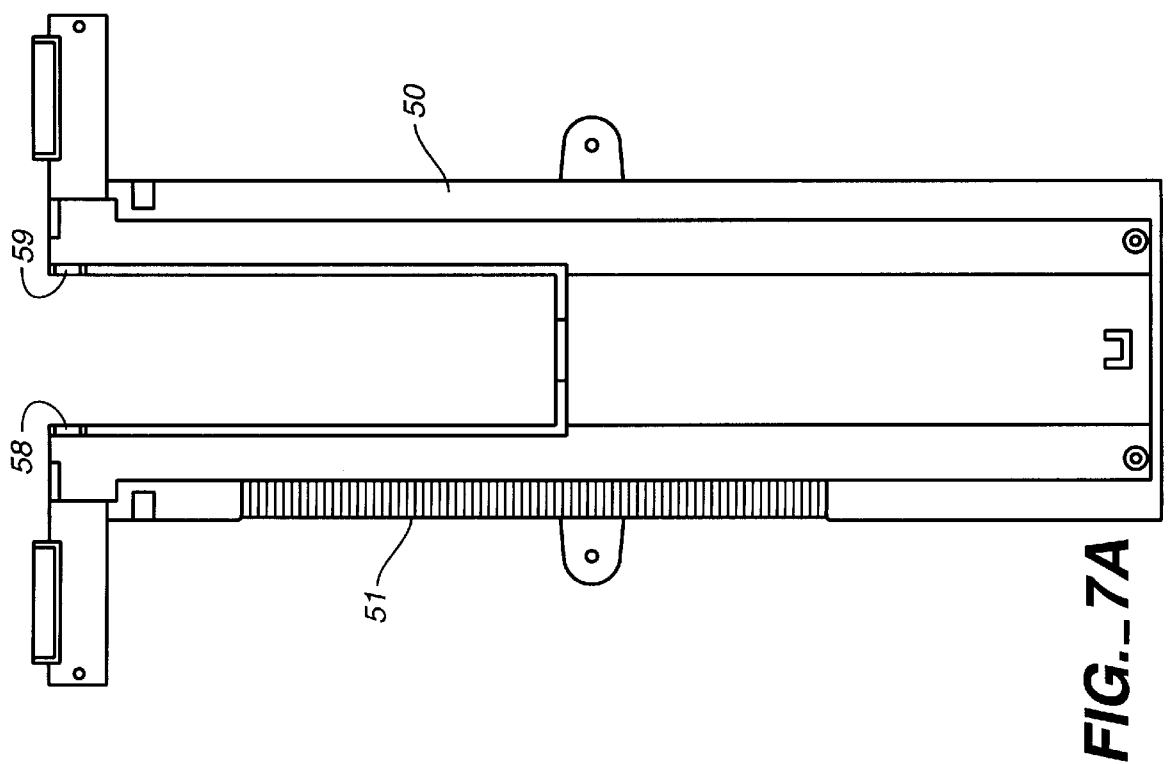
FIG._7A

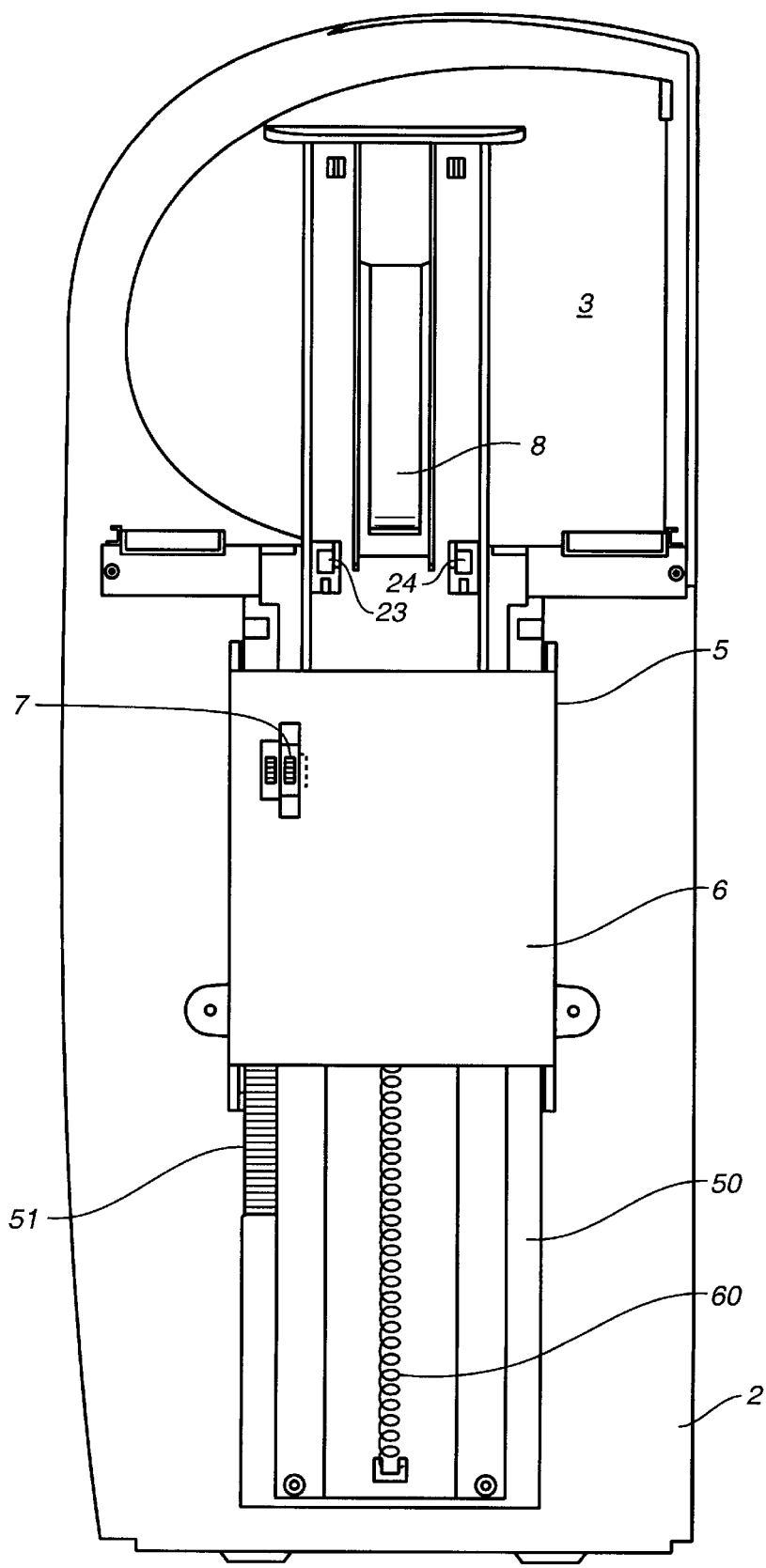
FIG._8

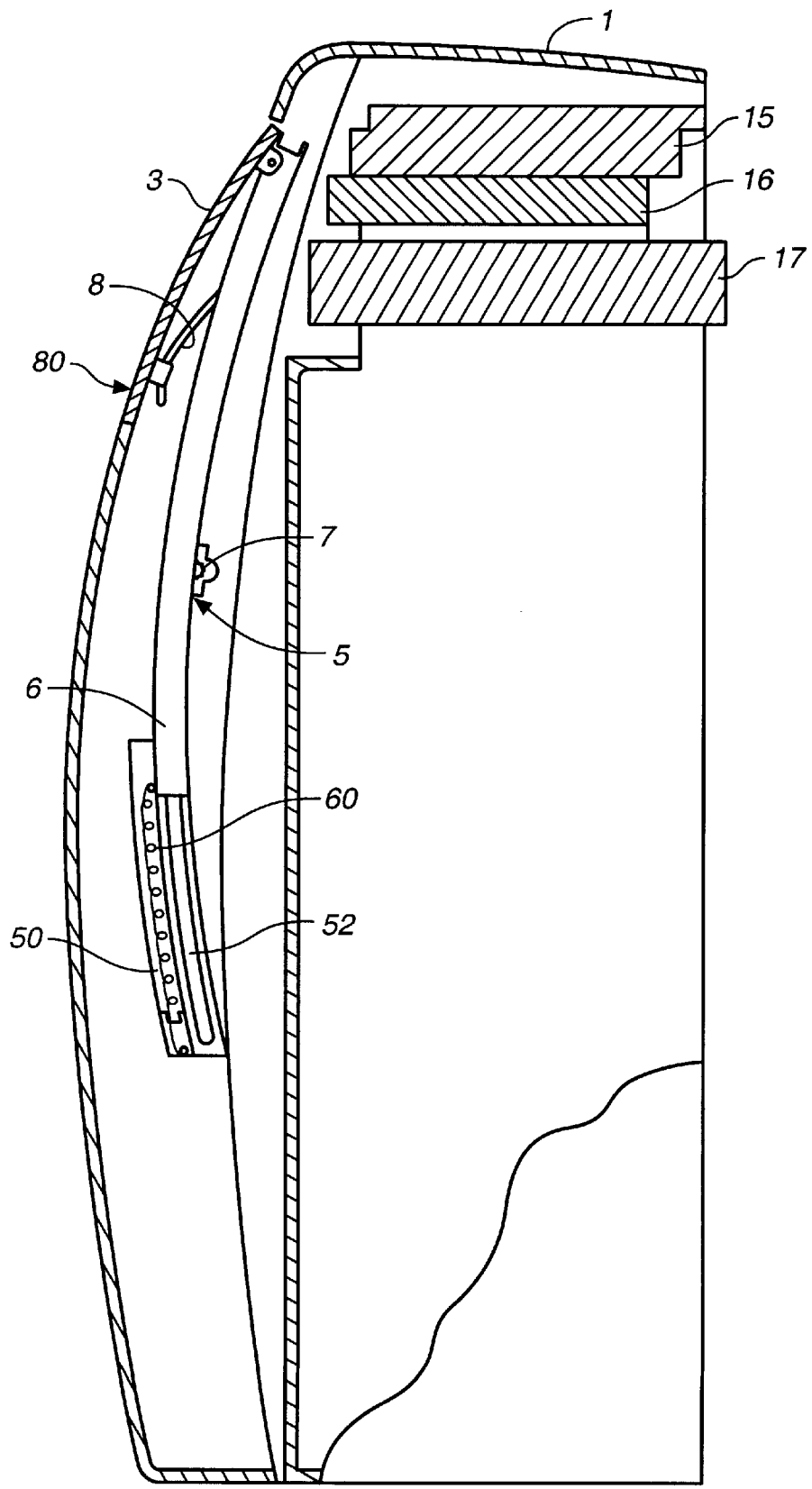
FIG._10

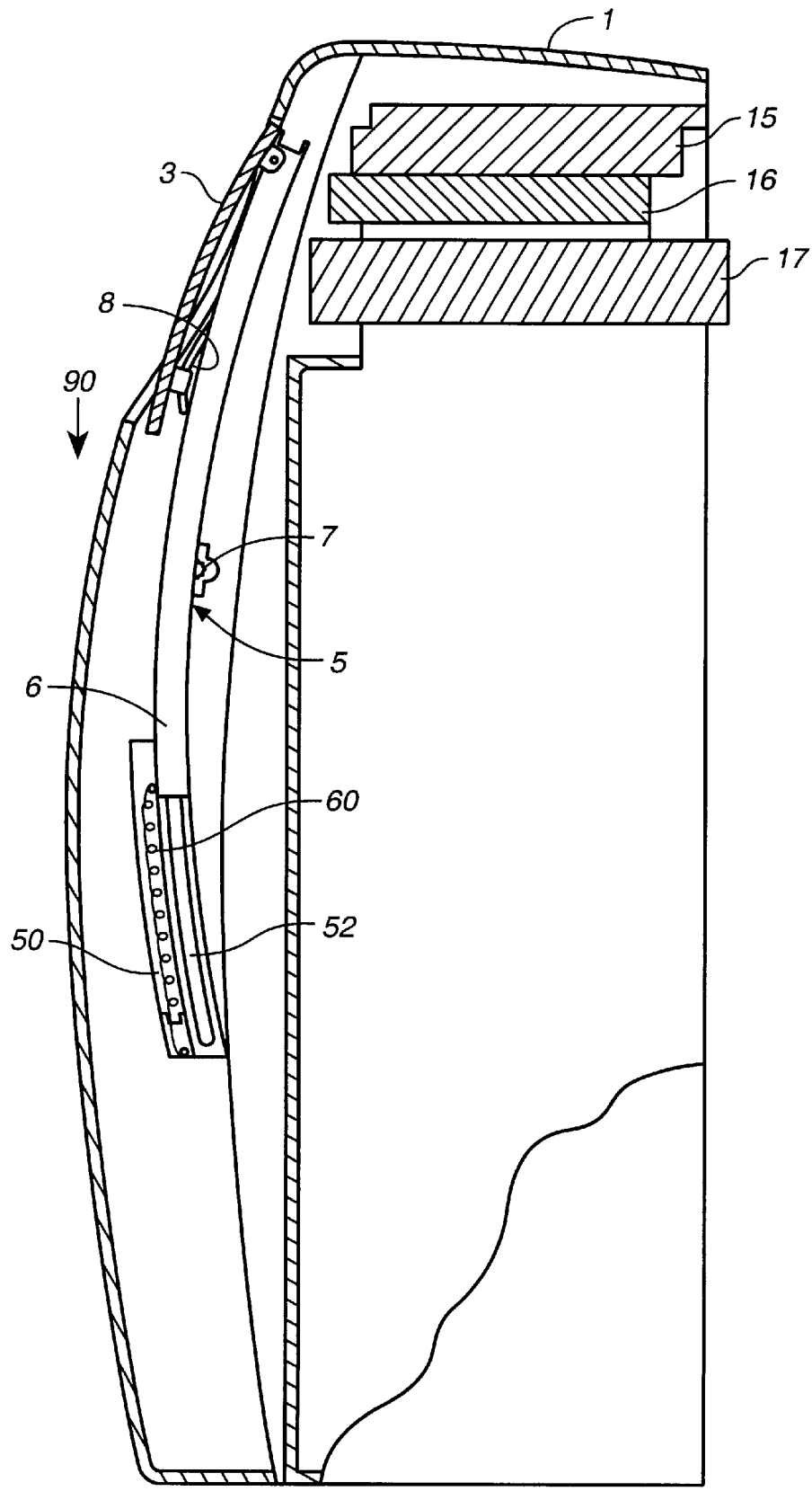
FIG._11

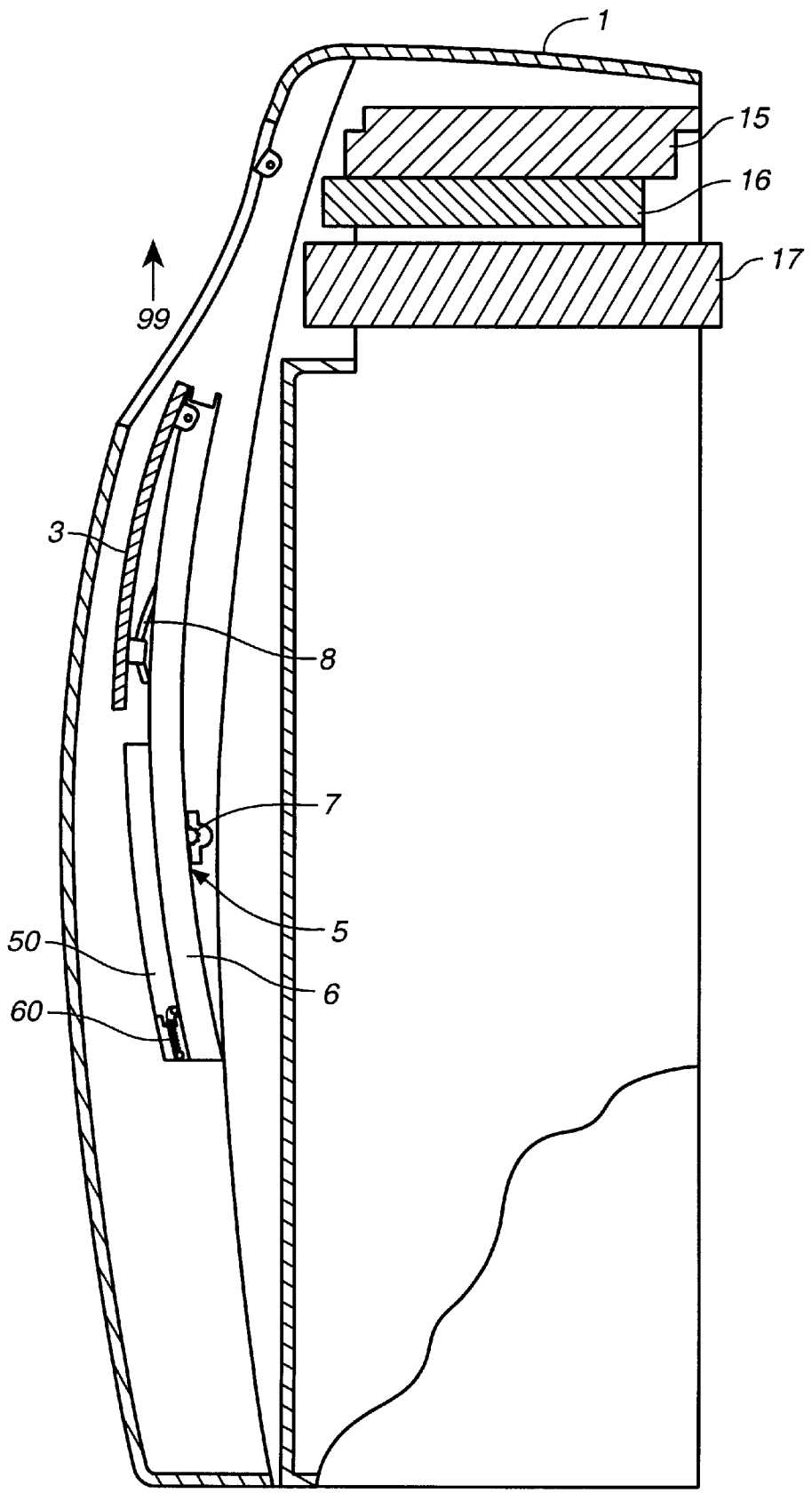
FIG._12

DOOR ASSEMBLY FOR A COMPUTER

TECHNICAL FIELD

The present claimed invention relates to the field of enclosures for computing devices. More specifically, the present claimed invention relates to an improved door assembly for a computing device.

BACKGROUND ART

Prior art computer systems typically include a computer housing that includes a front panel which is commonly referred to as a bezel that attaches to a computer cover that encloses the top, rear, and sides of the chassis. A door attaches to the bezel so as to allow for access to certain components of the computer such as disk drives, tape drives, floppy drives, etc. The door protects the drives and other delicate hardware, but allows access to media in the drives (floppies, CD's, etc.). Prior art computer systems attach the door to the bezel using hinges such that the door swings to one side or the other when the door is opened. Other designs swing up or down to open and close.

With prior art computer systems that use swinging doors, when the computer system is located in an area with restricted space, often the door either cannot be opened or can only be partially opened. In addition, when the door is open the door is subject to damage. The user may brush against or press against the door so as to force the door past the fully open position. This may cause the door to break off. In addition, when the door is open, a user may attempt to move the computer. The movement of the computer may result in the door striking an object so as to break or damage the door.

Computers are often placed on the floor. Thus, users must bend down or reach down to access the computer. In order to provide easy access to the various components of the computer the components to be accessed and the door must be located within the upper region of the computer to be easily accessible to a user. Typically, at a minimum, components are placed in the upper half of the computer so as to allow a user to easily reach the components. This imposes an additional design restraint that limits the size and design of the door.

Recently, computer manufacturers have incorporated door designs that slide open and closed so as to overcome the problems associated with swinging door designs. However, sliding doors often bind (also referred to as racking) on one side of the door or the other when the door is opened or closed. Prior art sliding door designs work well with bezels that are rectangular and bezels that are not curved. Prior art designs can also work with bezels that are moderately curved in an arc parallel to the direction of travel of the sliding door. However, such prior art computer designs do not work when the bezel is curved in a direction other than an arc parallel to the direction of travel of the sliding door or when the bezel is curved in more than one plane.

What is needed is a door assembly that will work with bezel designs that are curved in directions other than the direction of travel of the sliding door. Also, a door assembly is needed that works with a bezel that is curved in more than one plane. In addition, a door assembly is needed that does not require a lot of space in the front and side of the computer in order to be opened. Furthermore, a door assembly is needed that includes a door that is easy to open and close and that does not bind. The present invention provides an elegant solution that meets the above needs.

DISCLOSURE OF THE INVENTION

The present invention meets the above needs with a door assembly that includes a door that is pivotally connected to a carriage that slides up and down. By using both a sliding carriage and a pivoting door, the door assembly of the present invention works well with bezel designs that are curved in directions other than the direction of travel of the sliding door. In addition, the door assembly of the present invention works with bezels that are curved in more than one plane.

A computer that includes a chassis covered by a housing is disclosed. The chassis is enclosed on the front, top, rear and on two sides by the cover, with the bezel enclosing the front of the computer. A door assembly that includes a door that selectively covers and uncovers the opening in the bezel allows a user to access devices such as drives that require the insertion and removal of removable media such as disks, tapes, etc. The door assembly also allows access to controls such as, for example, system displays, control switches, etc.

The door assembly of the present invention includes a door and a carriage assembly that are pivotally connected. In one embodiment of the present invention, the carriage assembly and the door slide up and down on a frame. When the carriage assembly is in its uppermost position, the opening in the bezel is covered by the door. This position is referred to as the closed position.

Upon pressing against the lower portion of the door, the door pivots and the carriage assembly and the door automatically slide down such that the door no longer covers the opening in the bezel. This position is referred to as the open position. In the open position, the devices and controls accessible through the opening in the bezel can be operated.

The door is moved back into the closed position by applying an upward force to the door so as to move the door and the carriage upward. As the door reaches the opening in the bezel a spring formed in the carriage forces the door against the bezel and into the closed position.

The present invention allows for easy access to components of the computer and in particular to removable media and controls. Also, the door assembly of the present invention is easy to open and close.

The door assembly of the present invention slides behind the bezel when the door is in the open position. Therefore, the door assembly does not require a lot of space on the front and side of the computer to be opened as do many prior art doors. Also, the door assembly of the present invention is less susceptible to damage than prior art systems that include doors that open by swinging sideways since there is no protrusion of the door from the computer. Also, the door assembly of the present invention does not bind as commonly occurs in prior art systems. Thus, the present invention provides a simple and elegant solution to the problems associated with prior art door opening and closing mechanisms.

Because the door assembly of the present uses both a sliding carriage and a pivoting door, the door assembly of the present invention works well with bezel designs that are curved in directions other than the direction of travel of the sliding door. In addition, the door assembly of the present invention works with bezels that are curved in more than one plane.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an upper right frontal perspective view of a computer having a door assembly that is in the closed position in accordance with one embodiment the present invention.

FIG. 2 is an upper right frontal perspective view of a computer having a door assembly that is in the unlatched position in accordance with one embodiment of the present invention.

FIG. 3 is an upper right frontal perspective view of a computer having a door assembly that is in the open position in accordance with one embodiment of the present invention.

FIG. 4A is a front view of a door in accordance with one embodiment of the present invention.

FIG. 4B is a rear view of a door in accordance with one embodiment of the present invention.

FIG. 4C is side view of a door in accordance with one embodiment of the present invention.

FIG. 4D is a right rear perspective view of a door in accordance with one embodiment of the present invention.

FIG. 5A is rear view of a carriage assembly in accordance with one embodiment of the present invention.

FIG. 5B is side view of a carriage assembly in accordance with one embodiment of the present invention.

FIG. 5C is front view of a carriage assembly in accordance with one embodiment of the present invention.

FIG. 6 is a side view of a door that is attached to a carriage assembly in accordance with one embodiment of the present invention.

FIG. 7A is a rear view of a frame in accordance with one embodiment of the present invention.

FIG. 7B is a right side view of a frame in accordance with one embodiment of the present invention.

FIG. 7C is a left side view of a frame in accordance with one embodiment of the present invention.

FIG. 8 is a rear view of a door assembly installed in a bezel in accordance with one embodiment of the present invention.

FIG. 9 is a cross-sectional view along axis B—B of FIG. 8 in accordance with one embodiment of the present invention.

FIG. 10 is a cut-away side view showing a door that is in the closed position in accordance with one embodiment of the present invention.

FIG. 11 is a cut-away side view showing a door that is in the unlatched position in accordance with one embodiment of the present invention.

FIG. 12 is a cut-away side view showing a door that is in the open position in accordance with one embodiment of the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

With reference now to FIG. 1, computer 100 is shown to include a housing 1 that includes bezel 2. Housing 1 encloses the electrical components of computer 100. In the present embodiment, the front side of bezel 2 is curved along both horizontal and vertical axes. Door 3 is shown to be in the closed position. With door 3 in the closed position, the internal components of computer 100 are enclosed and protected by housing 1 and door 3. In one embodiment, bezel 2 and door 3 are made of injection molded plastic. However, the present invention is well adapted for use of other materials for forming bezel 2 and door 3.

FIG. 2 shows computer 100 after door 3 is moved inward into the unlatched position. In the unlatched position, door 3 is no longer flush with the adjoining surfaces of the front of bezel 2. More particularly, the bottom of door 3 is disposed inward relative to the position of the bottom of door 3 in FIG. 1.

FIG. 3 shows computer 100 after door 3 is moved downward into the open position. The movement of door 3 into the open position exposes a portion of chassis 10. Chassis 10 houses the internal components of computer 100. Computer 100 includes electronic circuits for data input and output, data storage and data processing. Drive 15, drive 16 and drive 17 are attached to chassis 10 and are electrically connected with the other electronic circuits of computer 100. Drives 15–17 are exposed when door 3 is in the open position so as to allow for easy access to drives 15–17. Drives 15–17 could be floppy disk drives, CD ROM drives, read/write disk drives, tape drives or any of a number of other accessories or components which the user may need to access on a regular basis.

Continuing with FIG. 3, the placement of drives 15–17 behind door 3 allows a user to close door 3 during normal operation of computer 100. Thus, the user does not have to continually look at drives 15–17 that are not used all of the time. Door 3 also serves to protect drives 15–17 from damage and from environmental elements such as dust, moisture, and foreign matter spilled or dropped on the computer. However, since door 3 is easy to open, a user may readily gain access to drives 15–17 by opening door 3.

FIGS. 4A–4D show door 3 after door 3 is removed from computer 100. The front of door 3 includes door face 30 that is contoured so as to conform to the contour of the front of bezel 2. Pins 21–24 extend outward from tabs that protrude from the rear surface of door 3. Extending members 25–26 also extend from the rear surface of door 3.

Referring now to FIGS. 5A–5C, carriage assembly 5 includes carriage 6 and rotary dampener 7. In the present embodiment, carriage 6 is a molded plastic part that includes a spring 8 and provision for mounting rotary dampener 7. Carriage 5 also includes pins 11–14.

Door 3 couples to carriage 6 as shown in FIG. 6. In the present embodiment, door 3 is pivotally coupled to carriage 6 by pins 21–22 shown in FIGS. 4B–4D. More particularly, pins 21–22 engage corresponding openings in carriage 6 such that door 3 pivots relative to carriage 6. However, the present invention is well adapted for other connection mechanisms for coupling door 3 to carriage 6 such that door 3 pivots relative to carriage 6.

Continuing with FIG. 6, spring 8 engages door 3 such that door 3 can be pressed so as to compress and decompress spring 8. In the present embodiment, spring 8 engages extending members 25–26 of FIGS. 4B–4D.

FIGS. 7A–7C shows frame 50 that is adapted to receive door 3 and carriage assembly 5. In the present embodiment, frame 50 includes rack 51 and indentations 58–59. Referring now to FIGS. 7B–7C, slot 52 extends on one side of frame 50 and slot 53 extends on the opposite side of frame 50. In the present embodiment, slots 52–53 run along most of the length of frame 50.

FIGS. 8–9 show a bezel 2 onto which frame 50, carriage assembly 5 and door 3 are mounted. In the present embodiment, spring 60 couples on one end to frame 50 and on its opposite end to carriage 6. Spring 60 acts on carriage 6 for automatically moving carriage assembly 5 and door 3 from the unlatched position into the open position.

Referring now to FIGS. 8–9, in the present embodiment, pins 11 and 13 engage slot 52 of frame 50 and pins 12 and 14 engage slot 53 so as to securely hold frame 50 and carriage 6 together such that carriage assembly 5 slides up and down relative to frame 50 within a predetermined range of motion.

Referring to FIG. 8, in the present embodiment, pins 23–24 are adapted to engage indentations 58–59 of FIG. 7A for holding door 3 in the closed position. In the closed position, spring 8 asserts a force against door 3 so as to hold door 3 in the closed position and so as to keep pins 23–24 engaged with indentations 58–59.

FIGS. 10–12 show the operation of the door assembly of the present invention. When a user desires to open door 3 of FIG. 10, the user needs only to press inward on door 3 near the bottom of door 3 as shown by arrow 80 so as to pivot door 3 relative to carriage assembly 5. This moves door 3 inward such that the bottom of door 3 is within the enclosure formed by bezel 2. This also disengages pins 23–24 of FIG. 7A from indentations 58–59 such that carriage 6 is free to move along frame 50.

FIG. 11 shows the structure of FIG. 10 after door 3 is moved into the unlatched position. Once door 3 is moved into the unlatched position, the downward force exerted by spring 60 then moves carriage assembly 5 and door 3 downward as shown by arrow 90. Door 3 and carriage assembly 5 then move downward, as guided by grooves 52–53 until carriage 6 reaches the ends of grooves 52 and 53 respectively.

In the present embodiment, rotary dampener 7 engages rack 51 for moderating the motion of door 3 and carriage 6. More particularly, in the present embodiment, rotary dampener 7 includes a pinion that rotates and a dampening mechanism for controlling the rotation of the pinion. Dampener 7 is attached to carriage 6 such that the teeth of the pinion engage the teeth of rack 51. The dampening mechanism of dampener 7 moderates the movement of door 3 as it slides both up and down. Though any of a number of different types of dampeners could be used, in one embodiment, dampener 7 is a 2G54KC99950 dampener manufactured by NIFCO, INC. of Japan.

FIG. 12 shows door 3 and carriage assembly 5 in the open position. In the open position, the user has easy access to drives 15–17.

Referring still to FIG. 12, door 3 is easily closed by applying upward pressure to door 3 as shown by arrow 99. Door 3 and carriage assembly 5 then move upward. The movement of door 3 and carriage assembly 5 applies tension to spring 60. During the upward travel of door 3 and carriage assembly 5, dampening mechanism 7 prevents door 3 from moving too rapidly. When door 3 reaches the opening in bezel 2, spring 8 forces door 3 into the opening such that door 3 fits into the opening in bezel 2. As door 3 moves into the opening in bezel 2, pins 23–24 engage indentations 58–59 so as to hold door 3 in the closed position as is shown in FIG. 8. Spring 8 holds door 3 flush against bezel 2 such that the front surface of bezel 2 has a uniform surface.

Although the door assembly of the present invention could operate without dampening mechanism 7 of FIGS. 4–12, door 3 would bang as it is reaches the closed position and/or move too rapidly at the start of the closing operation. Though a spring that is weak enough to prevent such banging could be used, the movement would be too slow, particularly at the end of the door's movement. By using a door assembly that includes a dampener, a spring 60 which has a force strong enough to quickly open door 3 can be used without excessively fast movement of door 3 as it first starts to close and without unnecessary noise and jarring as door 3 moves into the open position.

In the present embodiment, spring 60 of FIG. 8 is a standard extension spring. However, alternatively, other mechanisms can be used that apply a downward force to door 3 and carriage assembly 5, such as, for example, configurations that use coil springs, volute springs and/or leaf-type springs. Compression springs and constant force spring assemblies can also be used.

Though the door assembly of the present invention is described in FIGS. 1–12 as moving in an upward direction to close and moving downward to open, a door that opens upward and closes by downward movement could also be used. In addition, the door assembly of the present invention is described with reference to automatically opening upon the application of pressure to door 3, the door could be designed to automatically close upon the application of pressure to door 3. Also, the present invention is well adapted for being-manually moved into both the open position and into the closed position.

Though the door assembly of the present invention is described in FIGS. 1–12 as including a frame 50 that attaches to the bezel, alternatively, the structure of frame 50 could be formed within the bezel itself. Also, the door assembly of the present invention could be implemented in a computer housing that does not include a bezel. In such an embodiment, frame 50 is attached to the computer housing proximate an opening in the computer housing. The present invention is also well adapted for use with other types of mechanisms that allow for carriage assembly 5 to move up and down relative to bezel 2. Such alternate mechanisms that can be used to move carriage assembly up and down include roller bearings, wheels, different slot and pin structures, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A door assembly for a computer that includes a housing having an opening formed therein, said door assembly comprising:
   a carriage slideably attached to said housing such that said carriage moves within a range of motion relative to said housing;
   a door pivotally coupled to said carriage and adapted to cover said opening in said housing, said door movable upon pivoting said door for uncovering said opening in said housing;
   a first spring operable to apply force to said door such that, when said door is in the closed position, said door is pressed against said housing; and
   a second spring coupled to said carriage so as to apply downward force to said carriage, said second spring operable to move said carriage downward.

2. The door assembly of claim 1 wherein said housing includes a bezel and wherein said opening in said housing is formed within said bezel.

3. The door assembly of claim 1 further comprising:
   a rack coupled to said housing; and
   a rotary dampener that includes a pinion, said rotary dampener coupled to said carriage and engaging said rack for moderating the movement of said carriage.

4. The door assembly of claim 3 wherein said first spring further comprises a flexible extending portion that extends from said carriage.

5. The door assembly of claim 4 wherein said second spring comprises an extension spring.

6. The door assembly of claim 4 wherein said door further comprises a pin that is adapted to engage an indentation when said carriage and said door are in said closed position, said pin engaging said indentation so as to hold said door in the closed position.

7. The door assembly of claim 5 wherein said door and said carriage are formed of plastic.

8. The door assembly of claim 7 wherein said bezel has a front surface that is contoured and wherein the face of said door is contoured so as to conform to the contour of said bezel.

9. The door assembly of claim 8 further comprising a frame that is coupled to said bezel, said frame having a first slot and a second slot disposed therein, said first slot adapted to receive corresponding pins extending from said carriage so as to couple said carriage to said frame.

10. A method for allowing access to components of a computer comprising the steps of:
    providing a carriage slideably coupled to the housing of said computer;
    providing a door pivotally coupled to said carriage, said door extending into an opening in said housing; and
    pressing inward on said door such that said door pivots, said carriage and said door automatically moving downward such that said door no longer covers said opening in said housing, thereby providing access to said components of said computer.

11. The method of claim 10 further comprising the step of:
    providing a first spring operable to apply force to said door such that, when said door is in the closed position, said door is pressed against said housing.

12. The method of claim 11 further comprising the step of:
    providing a second spring coupled to said carriage, said second spring applying a downward force to said carriage for moving said carriage and said door downward.

13. The method of claim 10 further comprising the step of:
    dampening the movement of said door using a rotary dampener that includes a pinion, said pinion engaging a rack for moderating the movement of said carriage.

14. The method of claim 13 further comprising the step of:
    holding said door in the closed position using a pin that is adapted to engage a detent.

15. The method of claim 13 further comprising the step of:
    closing said door by applying an upward force to said door, said upward force moving said door and said carriage upward, said door moved by said first spring into said opening in said housing.

16. An enclosure for a computer comprising:
    a bezel having an opening formed therein;
    a carriage slideably attached to said bezel such that said carriage moves within a range of motion relative to said bezel;
    a door pivotally coupled to said carriage and adapted to cover said opening in said housing, said door movable upon pivoting said door for uncovering said opening in said housing;
    a first spring operable to apply force to said door such that, when said door is in the closed position, said door is pressed against said bezel; and
    a second spring coupled to said carriage so as to apply downward force to said carriage, said second spring operable to move said carriage downward.

* * * * *